United States Patent [19]

Bryant

[11] Patent Number: 5,054,608

[45] Date of Patent: Oct. 8, 1991

[54] LINEAR ACTUATOR WITH IMPROVED FORCE DISTRIBUTION CHARACTERISTICS

[76] Inventor: Charles B. Bryant, 32380 Wildwood Point Rd., Hartland, Wis. 53209

[21] Appl. No.: 572,046

[22] Filed: Aug. 23, 1990

[51] Int. Cl.$^5$ .............................................. B65G 23/44
[52] U.S. Cl. ..................................................... 198/816
[58] Field of Search ........................................ 198/816

[56] References Cited

U.S. PATENT DOCUMENTS

| | | | |
|---|---|---|---|
| 2,565,437 | 8/1951 | Miller et al. | 198/816 X |
| 2,741,358 | 4/1956 | Bledsoe | 198/816 X |
| 2,808,924 | 10/1957 | Wood | 198/816 |
| 2,939,571 | 6/1960 | Robertson | 198/816 |
| 3,051,299 | 8/1962 | Stoner | 198/816 |
| 3,118,315 | 1/1964 | Loosli . | |
| 3,474,893 | 10/1969 | Morine | 198/816 X |
| 3,832,910 | 9/1974 | Bryant . | |
| 3,921,793 | 11/1975 | Hutchinson et al. . | |
| 3,978,977 | 9/1976 | Michelbrink et al. | 198/816 |
| 3,993,185 | 11/1976 | Fleckenstein et al. . | |
| 4,137,784 | 2/1979 | Griffin . | |
| 4,544,061 | 10/1985 | Crandall . | |

Primary Examiner—D. Glenn Dayoan
Attorney, Agent, or Firm—Godfrey & Kahn

[57] ABSTRACT

A linear actuator (10) comprises a slider tube (24), a mount (26) located upon the slider tube (24), slider brackets (28) through which the slider tube (24) slides, a screw rod (30) rotation of which results in translation of the slider tube (24) and the mount (26), a stop (32) and a lock nut that enable a translational setting to be set, and a buttress (36). The linear actuator (10) imparts precise translational motion to an object such as bearings (20) of a take-up pulley (18) of a conveyor (12) and is subject to forces of tension and compression in the direction of translational motion. The screw rod (30) has a first end (62) and a second end (64). Rotation of the screw rod (30) causes the first end (62) of the screw rod (30) to be inserted further within the slider tube (24) or withdrawn therefrom, depending upon the direction of rotation. The buttress (36) is located proximate the second end (64) and substantially redirects the forces of tension and compression to a side wall (16) upon which the linear actuator is fixedly mounted. The buttress (36) is of sufficient bracing so as to not deflect under the forces.

19 Claims, 5 Drawing Sheets

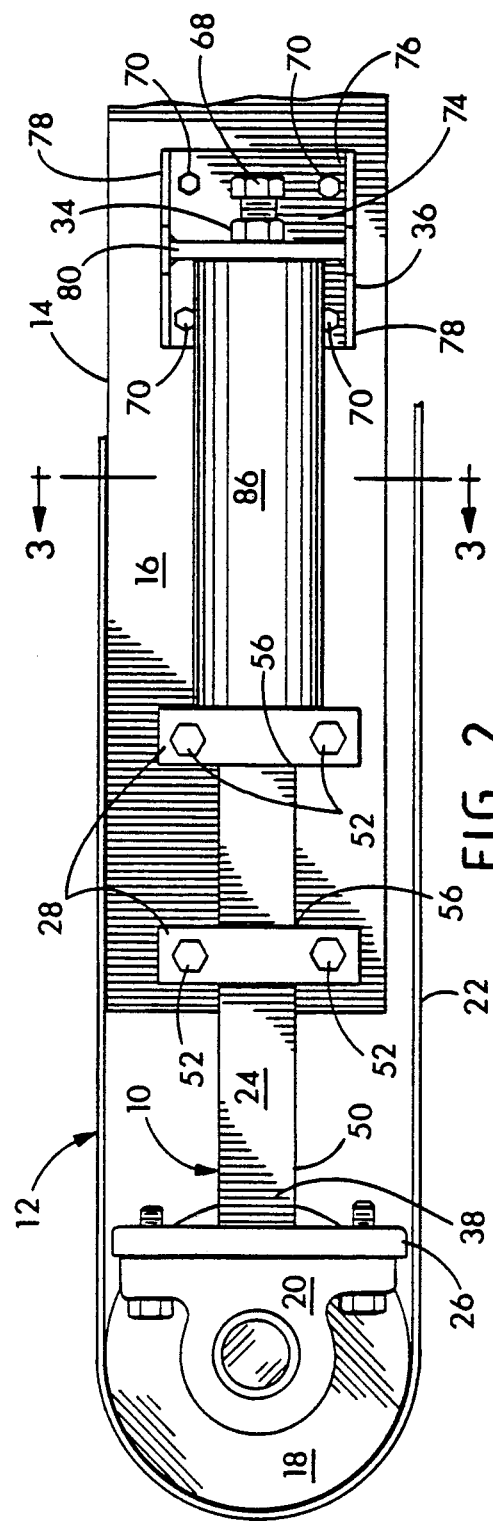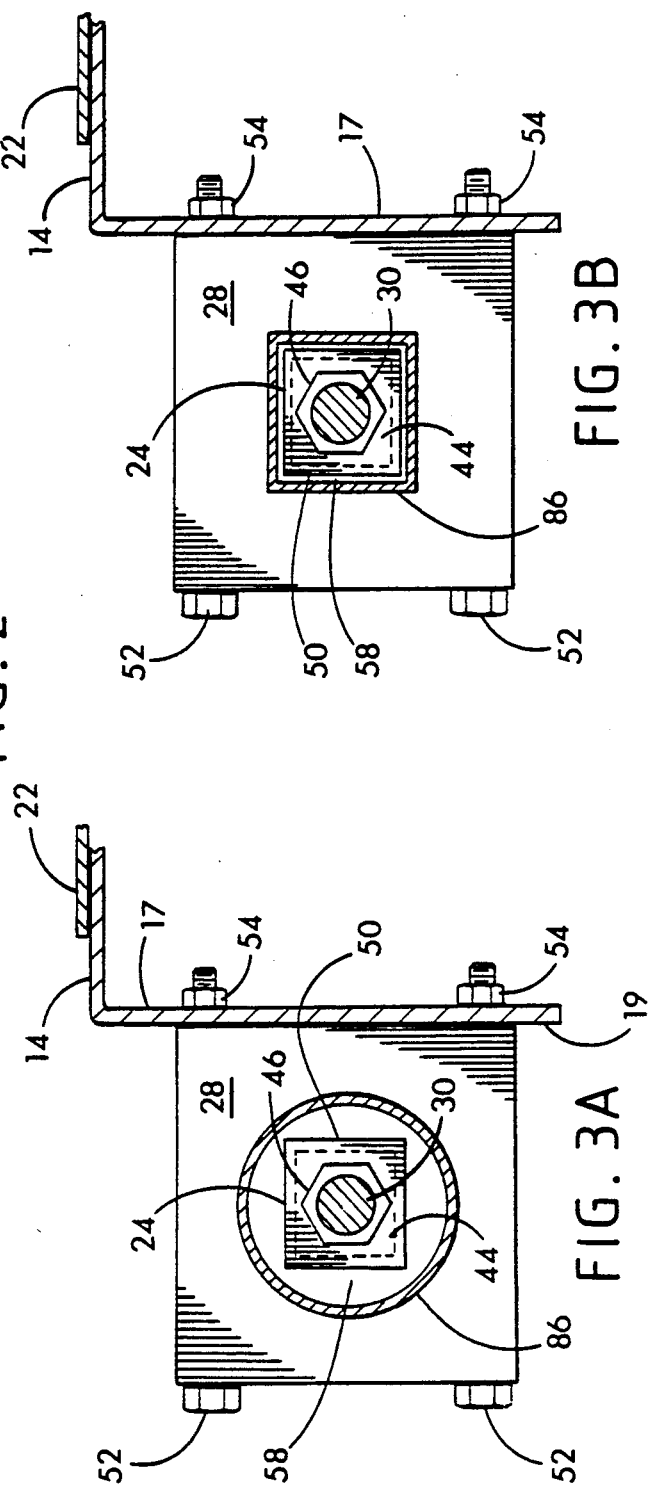

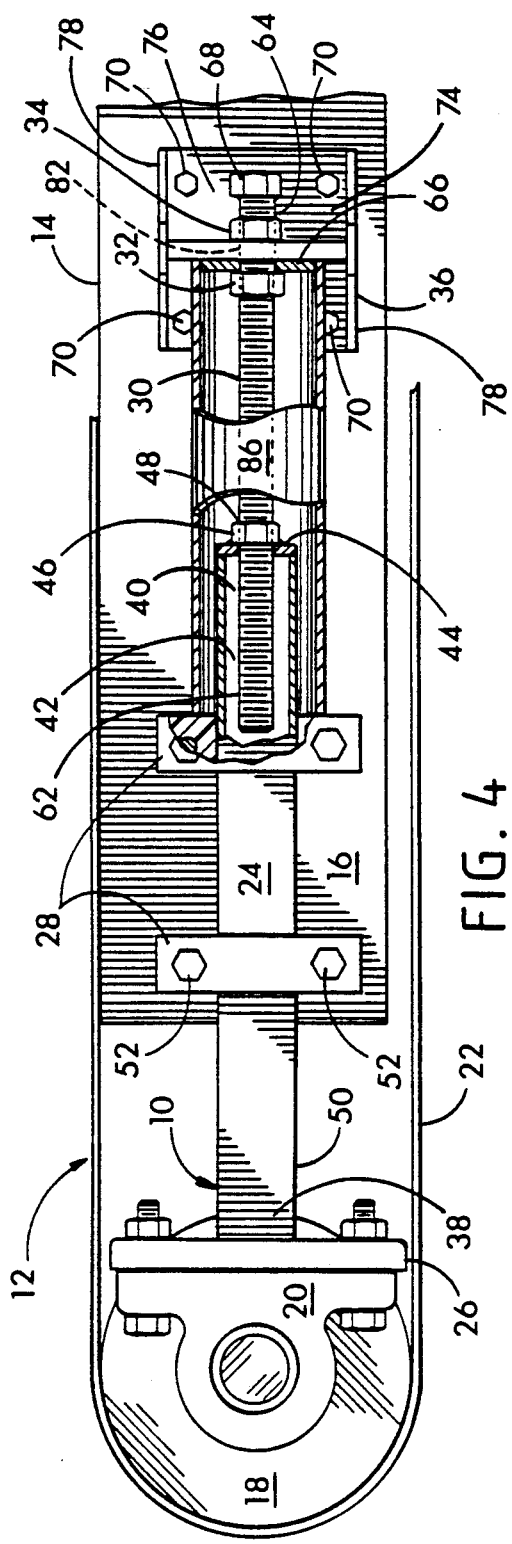
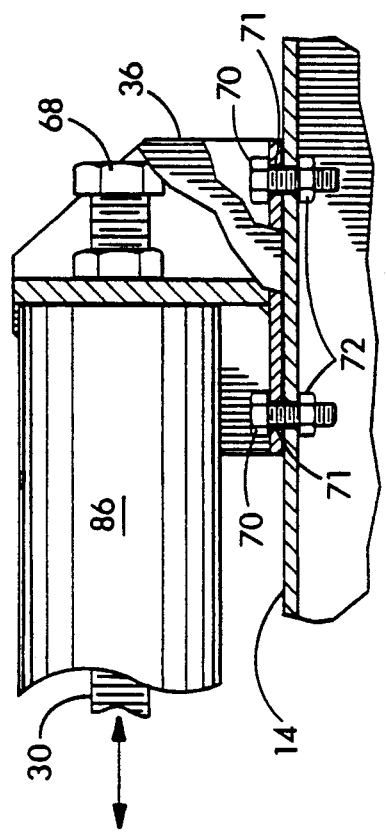

5,054,608

LINEAR ACTUATOR WITH IMPROVED FORCE DISTRIBUTION CHARACTERISTICS

FIELD OF THE INVENTION

This invention relates generally to linear actuators that experience tensile or compressive forces in the direction of translational travel, and particularly to devices for alignment of a take-up pulley in a conveyor to track the conveyor belt to center or adjust tension in the belt.

BACKGROUND OF THE INVENTION

Conveyors typically comprise a bed that is bounded by two vertical opposing side walls, a drive pulley mounted for rotation at one end of the conveyor, a take-up pulley mounted for rotation at the opposing end, and an endless belt that is oriented horizontally and that loops around each of the pulleys. It is often necessary to adjust the alignment of the take-up pulley to track the conveyor belt or to otherwise adjust the tension in the belt. U.S. Pat. No. 3,832,910 entitled TELESCOPIC BELT TIGHTENER and issued to Bryant is an example of a belt-tightening mechanism used to make such adjustments to the take-up pulley. In the Bryant patent, the belt tightener includes an outside tube fixed to mounting brackets and having an end plate, and an inside tube telescoped in the outside tube with one end of the inside tube having a plate which is connectable to a bearing block for the shaft that supports the endless belt. An adjusting bolt extends through the end plate of the outside tube and further extends into the inside tube, the adjusting bolt being threadably received by a nut welded to the other end of the inside tube. The adjusting bolt is used to adjust translation of the plate and bearing block.

In such a configuration, forces of tension and compression are distributed in a complex manner along the length of the tube and through the mounting brackets. Further, such a configuration requires welding of the brackets and end plate to the outside tube. Because of the complex forces acting through the tube and the brackets, it is necessary to ensure that each of the brackets and the end plate are properly welded to the outside tube.

Accordingly, a need has existed for a linear actuator that adjusts the orientation of the take-up pulley and eliminates the complex forces acting thereupon. A need has further existed for such a linear actuator that requires less welds, thus reducing the points of possible failure and reducing the time necessary to manufacture such linear actuator.

SUMMARY OF THE INVENTION

In accordance with the present invention, a linear actuator is disclosed that comprises a slider tube, a mount located upon the slider tube, slider brackets attachable to the wall in fixed relation through which the slider tube slides, a screw rod rotation of which results in translation of the slider tube and the mount, a stop and a lock nut that enable a translational setting to be locked into place, and a buttress. The screw rod has a first end and a second end. Rotation of the screw rod in one direction causes the first end of the screw rod to be inserted further within the slider tube, and the slider tube is correspondingly translated rearward through the slider brackets. Rotation of the screw rod in the opposite direction causes the first end of the screw rod to be withdrawn from the axial passageway of the slider tube, and the slider tube is correspondingly translated forward through the slider brackets.

The buttress is attached to the side wall in fixed relation. The buttress is preferably comprised of a U-channel having a flat base and two walls extending perpendicularly outward therefrom. A central plate that also extends perpendicularly outward from the flat base is oriented at right angles to the walls and is sized to fit between the walls. The central plate has a hole that allows passage of the screw rod therethrough. The central plate is located between the stop and the lock nut.

The linear actuator is subject to tension or compression forces that are directed in the direction of translational motion and that originate at the mount. The buttress substantially redirects the forces to the side wall upon which the linear actuator is fixedly attached. The buttress is located proximate the second end of the screw rod and is configured to not deflect under forces that are applied to it. Preferably, the buttress is a channel with a central plate welded in the center.

The linear actuator of the present invention that utilizes the above-described buttress requires less welds than the belt-type mechanism of the prior art, thus lessening the likelihood of failure of the linear actuator when in use and subject to forces of tension and compression, and further saves costs necessary to weld the several mounting brackets and the end plate to the outside tube. In the present invention, only the central plate needs to be welded in place between the two walls extending perpendicularly outward from the flat base.

Further objects, features, and advantages of the invention will be apparent from the following detailed description taken in conjunction with the accompanying drawings.

BRIEF DESCRIPTION OF THE DRAWINGS

In the drawings:

FIG. 2 is an elevation view of the linear actuator as used as a conveyor take-up, and viewed from the side of the conveyor.

FIG. 3A is a cross-section taken along line 3—3 of FIG. 2.

FIG. 3B is an alternate cross-section using a square dust cover.

FIG. 4 is the elevation view of the linear actuator such as was depicted in FIG. 2, with the dust cover being longitudinally cut away to show the screw rod and other internal parts.

FIG. 5 is a top plan view of the buttress with a portion of one of the walls extending outward from the base being cut away to show the central plate and bolt attachment to the side wall of the conveyor.

DETAILED DESCRIPTION OF THE PREFERRED EMBODIMENT

Figure 1:
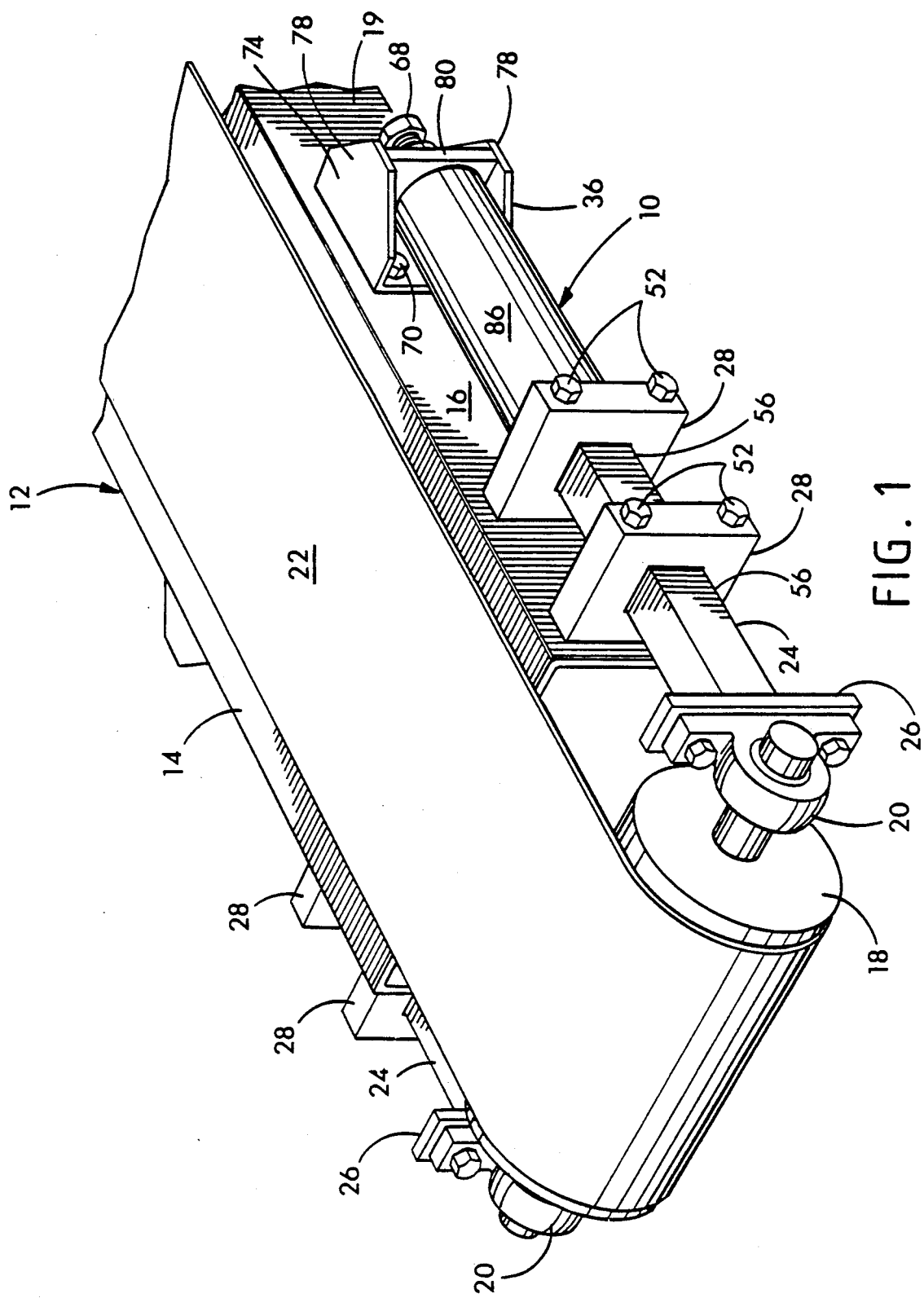
FIG. 1 is a perspective view of the linear actuator as use as a conveyor take-up.

With reference to the drawings, a linear actuator in accordance with the present invention is shown at 10 in FIGS. 1-4. A linear actuator is defined herein to mean a device that imparts precise translational motion to an object. A primary example of a linear actuator is used as a means to adjust the positions of the bearings of a take-up pulley in a conveyor in order to properly align such a take-up pulley to track the conveyor belt to center or to adjust tension in the belt. FIG. 1 depicts such an end use, showing the linear actuator 10 and a conveyor 12. The conveyor 12 typically comprises a bed 14 that is bounded by two vertical opposing side walls 16 having an inside surface 17 and an outside surface 19, a take-up pulley 18 mounted for rotation upon bearings 20 at one end of the conveyor 12, a drive pulley mounted for rotation at the opposing end of the conveyor (not shown), and an endless belt 22 that is oriented horizontally and that loops around at the take-up pulley 18 and at the drive pulley. FIG. 1 depicts only the take-up end of the conveyor 12 and only one side of the conveyor 12 is substantially visible in the perspective view. The opposing side of the conveyor 12 would be a mirror image of that side visible in FIG. 1. It is to be understood, therefore, that for the take-up pulley 18 there would be two bearings 20, one on each side of the conveyor 12, the position of each of the bearings 20 being individually adjusted by a linear actuator that imparts translational motion to align the take-up pulley 18 or to track or tension the belt 22.

The linear actuator 10 is attached to the side wall 16 at one end of the conveyor 12. The linear actuator 10 comprises a slider tube 24, a mount 26 located upon the slider tube 24, slider brackets 28 attachable to the wall 16 in fixed relation through which the slider tube 24 slides, a screw rod 30 rotation of which results in translation of the slider tube 24 and the mount 26, a stop 32 and a lock nut 34 that enable a translational setting to be locked into place, and a buttress 36 which is configured to substantially direct forces of tension and compression into the vertical wall 16 of the conveyor 12.

The slider tube 24 has a predefined axial length terminating at opposing forward and rearward ends 38 and 40. The tube 24 is hollow, having an axial passageway 42 through its interior that extends between the forward end 38 and the rearward end 40. The rearward end 40 is partially closed to form a surface 44 upon which a nut 46 is welded to form a threaded aperture 48 to engage with the screw rod 30. The threaded aperture 48 may be alternately formed, for example, by die cutting the threaded aperture within the surface 44. The threaded aperture 48 leads to the axial passageway 42 such that the axial passageway 42 provides a clearance for the screw rod 30 to enable the screw rod 30 to be inserted within the tube 24 upon rotation, explained further below. The exterior of the tube 24 is defined by an outer boundary 50 which is preferably square. The tube 24 is preferably made of steel and coated with powdered urethane coating based on.

Figure 7:
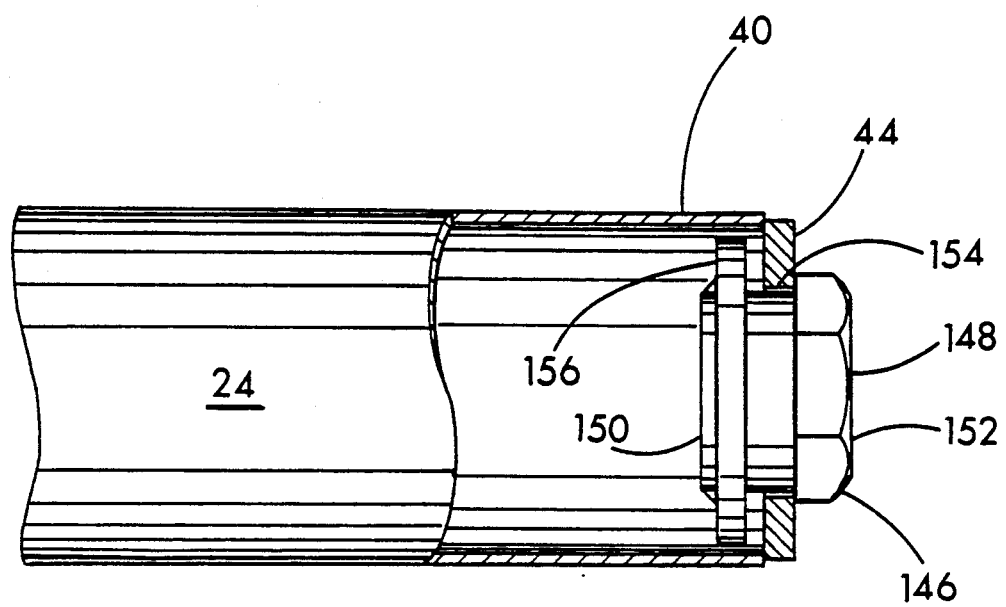
FIG. 7 is a cross-section through the slider tube showing an alternate threaded aperture that is "floating."

The above-described threaded aperture 48 requires close tolerances such that the threaded aperture 48 is not offset from the intended axis of rotation of the screw rod 30 and is not angularly displaced in order to prevent the screw rod 30 from binding. FIG. 7 shows a cross-section through the slider tube 24 that shows an alternate threaded aperture 148 that alleviates such a close tolerancing problem. The threaded aperture 148 is formed of a standard nut 146 having a first end 150 and a second end 152. The outside of the first end 150 of the nut 146 is turned down to a cylindrical shape while the outside of the second end 152 remains a standard hex shape. The rearward end 40 of the slider tube 24 has an end plate 44 that has a cylindrical hole 154 that receives the first end 150 of the nut 146 but is large enough to allow a certain amount of play between the first end 150 of the nut 146 and the hole 154 of the end plate 44. A plate 156 that is square in shape to prevent rotation within the axial passageway 42 is welded to the first end 150 of the nut 146. The result is that the nut 146 is "floating," with respect to the end plate 44 such that a certain amount of offset and angular displacement is permissible between the screw rod 30 and the slider tube 24. The amount of offset or angular displacement that is possible is dependent upon the amount of play between the first end 150 of the nut 146 and the hole 154 of the end plate. The alternate embodiment of FIG. 7 that utilizes a "floating" nut 146 does not require tolerances as tight as the nut 46 as shown in FIG. 4, and minimizes the possibility of binding of the screw rod 30.

The slider tube 24 is slidably mounted within the slider brackets 28. The slider brackets 28 are preferably made of polyvinyl chloride (PVC) or other material that has frictional characteristics that allow facilitated sliding of the slider tube 24 therethrough. Each of the slider brackets 28 are attached to the side wall 16 in fixed relation by bolts 52 and nuts 54 that engage with the bolts 52 on the inside surface 17 of the wall 16. Each of the slider brackets 28 have a centrally located opening 56 that defines an inner boundary 58 through which the slider tube 24 is capable of sliding. The inner boundary 58 of each of the slider brackets 28 is shaped to receive the outer boundary 50 of the slider tube 24 to allow axial translation of the slider tube 24 within the inner boundary 58. Thus, in the preferred embodiment wherein the slider tube 24 is square, the inner boundary 58 is likewise square. The use of a square or rectangular slider tube 24 is preferred because the outer boundary 50 of the slider tube 24 is naturally keyed to the inner boundary 58 of the slider brackets 28 so that the slider tube 24 will not rotate within the slider brackets 28. The use of a cylindrical slider tube, not shown, may require an axial indentation that mates with a woodruff key mounted within a cylindrical inner boundary of one or both of the slider brackets 28 in order to prevent rotation of the slider tube within the slider brackets. Alternately, the use of a cylindrical slider tube may be keyed to a cylindrical inner boundary of each of the slider brackets by attaching a fin that extends radially outward and that mates within a slot in the slider brackets 28.

Figure 6A:
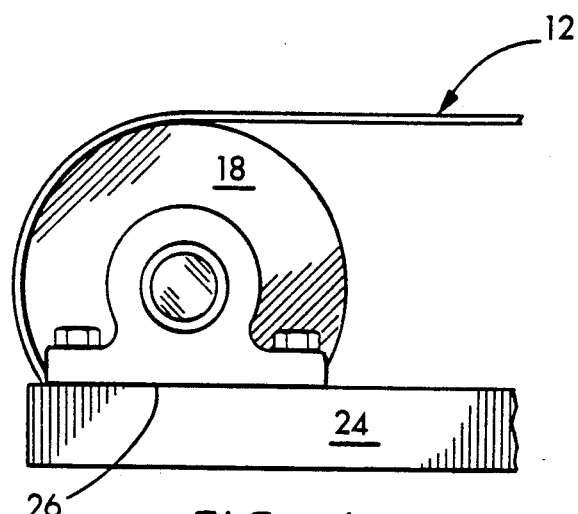
FIG. 6A is a side view depicting an alternate arrangement of attaching a bearing to the slider tube.
Figure 6B:
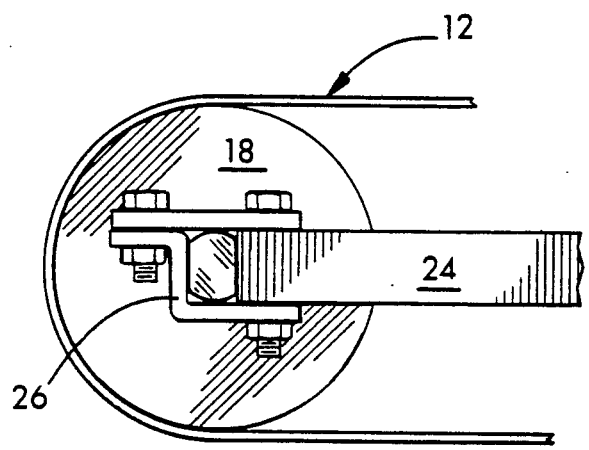
FIG. 6B is a side view depicting arrangement of attaching a motorized pulley to the slider tube.
Figure 6C:
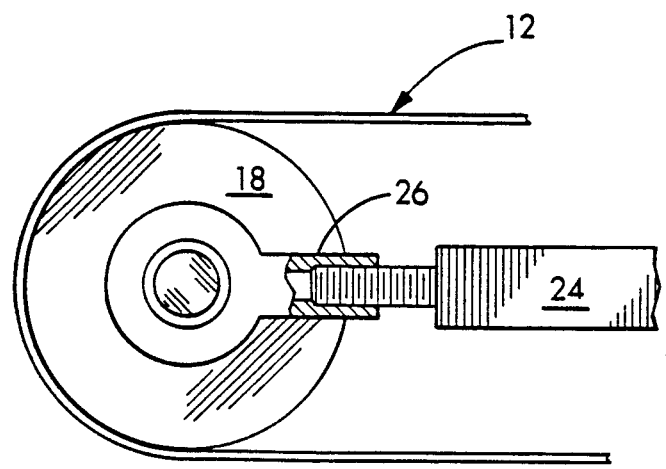
FIG. 6C is a side view depicting an arrangement of attaching a rod end bearing to the slider tube.

The mount 26 is designed to receive the object to which is imparted the translational motion. Where the linear actuator 10 is intended for use with the conveyor 12, the object is the bearing 20 or a stub shaft extending from the end of the take-up pulley 18. Thus, as depicted in FIGS. 1, 2, and 4, the mount 26 is a bearing plate 60 upon which is mounted the bearing 20. It is to be understood, however, that the invention is not limited to an application wherein the bearing plate 60 is configured such as in FIGS. 1, 2, and 4. FIGS. 6A, 6B and 6C show exemplary alternate mounts in which a bearing or stub shaft extending from the end of the take-up pulley is mounted to the slider tube 24 in order to impart the necessary translational motion. It is to be further understood that there may be other necessary configurations for the mount 26 that is attached to the slider tube 24 for applications of the linear actuator 10 other than as a means for adjusting the bearings or roll stub shafts of a takeup pulley in a conveyor.

The screw rod 30 has a first end 62 and a second end 64 that axially oppose each other and is threaded across its length. The rod threadably engages with the threaded aperture 48 of the tube 24 such that the first end 62 of the rod 30 is inserted into the axial passageway 42 of the tube 24 upon rotation of the screw rod 30 on its axis in one direction and withdrawn from the axial passageway 42 of the tube 24 upon rotation of the screw rod on its axis in the opposite direction. The stop 32 is welded to the screw rod 30 proximate the second end 64 between the first and second ends 62 and 64. The lock nut 34 threadably engages with the screw rod 30 from the second end 64. A compression washer 66 is positioned on the screw rod between the stop 32 and the lock nut 34. A hex nut 68 is welded or pinned to the screw rod 30 at the second end 64 to allow turning of the second end 64 by a wrench in order to effect the necessary translation of the slider tube 24 and the mount 26.

The buttress 36 is attached to the side wall 16 in fixed relation by bolts 70 that extend through holes 71 and nuts 72 that engage with the bolts 70 on the inside surface 17 of the wall 16. As depicted in FIGS. 1-5, the buttress 36 is preferably comprised of a U-channel 74 having a flat base 76 and two walls 78 that extend perpendicularly outward therefrom. A central plate 80 that extends perpendicularly outward from the flat base 76 is oriented at right angles to the walls 78 and is sized to fit between the walls 78. The central plate 80 has a forward surface, a rearward surface, and a hole 82 that passes therethrough which is located to allow passage of the screw rod 30. The screw rod 30 extends beyond the hole 82 of the central plate 80 to allow threadable engagement with the lock nut 34. The hole 82 is sized to be smaller than the stop 32 and the lock nut 34. The central plate 80 is located between the stop 32 and the lock nut 34 such that the stop 32 is ahead of the forward surface, and the lock nut 34 is behind the rearward surface. The compression washer 66 is positioned between the stop 32 and the central plate 80. The lock nut 34 is capable of being tightened against the central plate 80 of the buttress 36 to draw the stop 32, the washer 66, the central plate 80, and the lock nut 34 together to prevent turning of the screw rod 30. The lock nut 34 is capable of being loosened from the central plate 80 of the buttress 36 to space the central plate 80 and the lock nut 34 apart to allow turning of the screw rod 30.

As shown in FIGS. 1-5, the linear actuator 10 is applied to a use in which the actuator 10 is subject to compressive forces by the wrapping of the belt around the take-up pulley 18 and the drive pulley, and transmittal of such forces through the bearing 20 and the mount 26. The linear actuator 10 may also be subject to tensile forces when used as a conveyor take-up during removal of the belt 22. FIG. 5 shows a top plan view of the buttress with the direction of tension and compression forces as applied to the buttress 36 being designated by the double arrow. In the orientation of FIG. 5, forces of compression are directed to the right and forces of tension are directed to the left.

The linear actuator 10 of the present invention utilizes of a single bumper or buttress 36 that is formed to have a single base 76 through which axial tensile or compressive forces acting across the length of the slider tube 24 and the length of the screw rod 30 are redirected to the side wall 16 upon which the linear actuator 10 is fixably attached. Such tensile and compressive forces originate within the linear actuator 10 at the mount 26. The buttress 36 is located proximate the second end 64 of the screw rod 30 and is preferably configured to taper in cross-section as it extends outwardly from the base 76, such as is depicted in FIG. 5. Such a configuration allows the forces acting upon the buttress to be spread over the area of the base 76 to the side wall 16. Though the buttress 36 may be represented in various different configurations, the buttress 36 must have sufficient mass or bracing so as to not deflect under the forces of compression and tension that will be applied to it. The buttress 36 further is represented as a single block through which the forces of tension and compression are distributed, rather than having the forces distributed through an end plate and a plurality of mounting brackets in a complex manner, as in the prior art.

The linear actuator 10 has a dust cover 86 that is positioned between the most rearward bracket 28 and the central plate 80 of the buttress 36. The dust cover 86 is preferably a stainless steel round light gauge tube, such as depicted in FIGS. 1, 2, 3A, and 4. The compression washer 66 acts as a boss to hold the dust cover 86 in place. FIG. 3B shows an alternate dust cover which is a Unistrut steel square tube or PVC body that is square in cross-section. Other arrangements, such as a flexible boot, are possible so long as the dust cover 86 is larger than the square tube 24 so as not to impede the translational motion of the square tube 24. The dust cover does not functionally interact with the other parts other than to protect the threaded rod 30 and other internal parts from dirt or debris of the workplace environment. Where the screw rod 30 is greased, the dust cover 86 also keeps such grease within the linear actuator 10 so as not to be undesirably transferred to items not intended to be greased, e.g. products coming off of the conveyor 12.

In the operation of the linear actuator 10, the lock nut 34 is loosened from the central plate 80 to space apart the central plate 80 and the lock nut 34. The screw rod 30 is thus free to rotate by the use of a wrench that engages with the nut 68 that is fixed to the screw rod 30. Rotation of the screw rod 30 on its axis in one direction causes the first end 62 of the rod 30 to be inserted into the axial passageway 42 of the tube 24, and the tube 24 is correspondingly translated rearward through the slider brackets 28. The mount 26 is moved along with the rest of the tube 24, thus translating the bearing 20 or other object simultaneously rearward. Rotation of the screw rod 30 in the opposite direction on its axis causes the first end 62 of the rod 30 to be withdrawn from the axial passageway 42 of the tube 24, and the tube 24 is correspondingly translated forward through the slider brackets 28. The mount 26 is moved along with the rest of the tube 24, thus translating the bearing 20 or other object simultaneously rearward. Upon obtaining the desired translation of the mount 26 and the bearing 20 or other object, the translation may be set or locked into place by tightening the lock nut 34 against the central plate 80 to draw the stop 32 the central plate 80, and the lock nut 34 together to prevent turning of the screw rod 30.

It is to be understood that the linear actuator 10 is not limited to applications that align a take-up pulley to track the conveyor belt 22 to center or adjust tension in the belt 22, but may be used in other applications in which the linear actuator 10 is subject to compressive or tensile forces. It is further to be understood that the invention is not confined to the particular construction and arrangement of parts herein illustrated and described, but embraces such modified forms thereof as come within the scope of the following claims.

I claim:

1. A belt tensioner for translation of an object, which object is subject to forces of tension and compression in the direction of translation, the belt tensioner being mountable upon a surface and comprising:
   (a) a tube having an outer boundary, a forward end, and a rearward end, the forward and rearward ends axially opposing each other and the rearward end of the tube having a threaded aperture that leads to an axial passageway within the tube;
   (b) a mount located upon the tube and designed to receive the object;
   (c) a bracket capable of being attached to the surface in fixed relation and having an inner boundary that is shaped to receive the outer boundary of the tube to allow axial translation of the tube within the inner boundary in a telescoping arrangement;
   (d) a screw rod having a first end and a second end, the first and second ends of the rod axially opposing each other and the rod threadably engaging with the threaded aperture at the rearward end of the tube such that the first end of the rod is inserted into the axial passageway of the tube upon rotation of the rod on its axis in one direction and withdrawn from the axial passageway of the tube upon rotation of the rod on its axis in the opposite direction;
   (e) a stop that is attached to the screw rod in fixed relation between the first end of the screw rod and the second end of the screw rod;
   (f) a nut that threadedly engages with the screw rod proximate the second end of the screw rod;
   (g) a buttress including
      (i) a base capable of being attached to the surface in fixed relation; and
      (ii) a plate that extends outward from the base, the plate having a hole through which the screw rod passes such that the second end of the screw rod extends beyond the hole, the hole being sized smaller than the stop and the nut and located therebetween, the nut being capable of being tightened against the buttress to draw the stop, the buttress, and the nut together and prevent turning of the rod and the nut being capable of being loosened from the buttress to space the buttress and the nut apart to allow turning of the rod, the turning of the rod when the buttress and the nut are spaced apart resulting in a translation of the tube and the mount by the insertion of the screw rod into and the withdrawal of the screw rod from the axial passageway, the buttress being located proximate the second end of the screw rod and of sufficient bracing so as to not deflect under the forces of compression and tension applied to the buttress, the buttress substantially redirecting the forces to the surface upon which the buttress is attached.

2. The belt tensioner of claim 1 wherein the outer boundary of the tube is square and the inner boundary of the bracket is correspondingly square.

3. The belt tensioner of claim 1 wherein the mount is a bearing plate.

4. The belt tensioner of claim 1 wherein the bracket is made of polyvinyl chloride and the slider tube has a powdered urethane coating that is baked on.

5. The belt tensioner of claim 1 wherein the threaded aperture at the rearward end of the tube is formed by a nut located to the rearward end of the tube.

6. The belt tensioner of claim 1 wherein the screw rod has a second nut fixed to the second end of the screw rod to allow rotation of the screw rod by a wrench of the same size as the second nut.

7. The belt tensioner of claim 1 further including a dust cover that encloses the screw rod and extends between the bracket and the buttress.

8. A belt tensioner for translation of an object, which object is subject to forces of tension and compression in the direction of translation, the belt tensioner being mountable upon a surface and comprising:
   (a) a tube having an outer boundary, a forward end, and a rearward end, the forward and rearward ends axially opposing each other and the rearward end of the tube having a threaded aperture that leads to an axial passageway within the tube;
   (b) a mount located upon the tube and designed to receive the object;
   (c) a bracket capable of being attached to the surface in fixed relation and having an inner boundary that is shaped to receive the outer boundary of the tube to allow axial translation of the tube within the inner boundary in a telescoping arrangement;
   (d) a screw rod having a first end and a second end, the first and second ends of the rod axially opposing each other and the rod threadably engaging with the threaded aperture at the rearward end of the tube such that the first end of the rod is inserted into the axial passageway of the tube upon rotation of the rod on its axis in one direction and withdrawn from the axial passageway of the tube upon rotation of the rod on its axis in the opposite direction;
   (e) a stop that is attached to the screw rod in fixed relation between the first end of the screw rod and the second end of the screw rod;
   (f) a nut that threadedly engages with the screw rod proximate the second end of the screw rod;
   (g) a buttress capable of being attached to the surface in fixed relation and which has a hole through which the screw rod passes such that the second end of the screw rod extends beyond the hole, the hole being sized smaller than the stop and the nut and located therebetween, the nut being capable of being tightened against the buttress to draw the stop, the buttress, and the nut together and prevent turning of the rod and the nut being capable of being loosened from the buttress to space the buttress and nut apart to allow turning of the rod, the turning of the rod when the buttress and the nut are spaced apart resulting in a translation of the tube and the mount by the insertion of the screw rod into and the withdrawal of the screw rod from the axial passageway, the buttress being located proximate the second end of the screw rod and of sufficient bracing so as to not deflect under the forces of compression and tension applied to the buttress, the buttress substantially redirecting the forces to the surface upon which the buttress is attached,
   wherein the threaded aperture at the rearward end of the tube is formed by a second nut located to the rearward end of the tube and wherein the second nut at the rearward end of the tube is a floating nut to compensate for offset and displacement with respect to the screw rod.

9. A belt tensioner for translation of an object, which object is subject to forces of tension and compression in the direction of translation, the belt tensioner being mountable upon a surface and comprising:
  (a) a tube having an outer boundary, a forward end, and a rearward end, the forward and rearward ends axially opposing each other and the rearward end of the tube having a threaded aperture that leads to an axial passageway within the tube;
  (b) a mount located upon the tube and designed to receive the object;
  (c) a bracket capable of being attached to the surface in fixed relation and having an inner boundary that is shaped to receive the outer boundary of the tube to allow axial translation of the tube within the inner boundary in a telescoping arrangement;
  (d) a screw rod having a first end and a second end, the first and second ends of the rod axially opposing each other and the rod threadedly engaging with the threaded aperture at the rearward end of the tube such that the first end of the rod is inserted into the axial passageway of the tube upon rotation of the rod on its axis in one direction and withdrawn from the axial passageway of the tube upon rotation of the rod on its axis in the opposite direction;
  (e) a stop that is attached to the screw rod in fixed relation between the first end of the screw rod and the second end of the screw rod;
  (f) a nut that threadedly engages with the screw rod proximate the second end of the screw rod;
  (g) a buttress including
    (i) a flat base capable of being attached to the surface in fixed relation;
    (ii) two walls that extend perpendicularly outward from the flat base;
    (iii) a plate that extends perpendicularly outward from the flat base and which is oriented at right angles to the two walls, the plate having a hole through which the screw rod passes such that the second end of the screw rod extends beyond the hole, the hole being sized smaller than the stop and the nut and located therebetween, the nut being capable of being tightened against the plate to draw the stop, the plate, and the nut together and prevent turning of the rod and the nut being capable of being loosened from the buttress to space the plate and nut apart to allow turning of the rod, the turning of the rod when the plate and the nut are spaced apart resulting in a translation of the tube and the mount by the insertion of the screw rod into and withdrawal of the screw rod from the axial passageway, the buttress substantially redirecting the forces to the surface upon which the buttress is attached.

10. The belt tensioner of claim 9 wherein the outer boundary of the tube is square and the inner boundary of the bracket is corresponding square.

11. The belt tensioner of claim 9 wherein the mount is a bearing plate.

12. The belt tensioner of claim 9 wherein the bracket is made of polyvinyl chloride and the slider tube has a powdered urethane coating that is baked on.

13. The belt tensioner of claim 9 wherein the threaded aperture at the rearward end of the tube is formed by a nut located to the rearward end of the tube.

14. The belt tensioner of claim 13 wherein the nut at the rearward end of the tube is a floating nut to compensate for offset and displacement with respect to the screw rod.

15. The of claim 9 wherein the screw rod has a second nut fixed to the second end of the screw rod to allow rotation of the screw rod by a wrench of the same size as the second nut.

16. The belt tensioner of claim 9 wherein the buttress extends outward from the flat base in a taper.

17. The belt tensioner of claim 9 further including a dust cover that encloses the screw rod and extends between the bracket and the plate.

18. A belt tensioner for translation of a conveyor roll, the belt tensioner being mountable upon a surface and comprising:
  (a) a tube having an outer boundary, a forward end, and a rearward end, the forward and rearward ends axially opposing each other and the rearward end of the tube having a threaded aperture that leads to an axial passageway within the tube;
  (b) a mount located upon the tube and designed to receive the conveyor roll;
  (c) a bracket capable of being attached to the surface in fixed relation and having an inner boundary that is shaped to receive the outer boundary of the tube to allow axial translation of the tube within the inner boundary in a telescoping arrangement;
  (d) a screw rod having a first end and a second end, the first and second ends of the rod axially opposing each other and the rod threadedly engaging with the threaded aperture at the rearward end of the tube;
  (e) a stop that is attached to the screw rod in fixed relation between the first end of the screw rod and the second end of the screw rod;
  (f) a nut that threadedly engages with the screw rod proximate the second end of the screw rod;
  (g) a base capable of being attached to the surface in fixed relation; and
  (h) a plate intermediate the stop and the nut that extends outward from the base, the plate having a hole through which the screw rod passes, the turning of the rod when the buttress and the nut are spaced apart resulting in a translation of the tube and the mount by the insertion of the screw rod into and the withdrawal of the screw rod from the axial passageway.

19. A belt tensioner for translation of a conveyor roll, the belt tensioner being mountable upon a surface and comprising:
  (a) a tube having an outer boundary, a forward end, and a rearward end, the forward and rearward ends axially opposing each other;
  (b) a floating nut located to the rearward end of the tube;
  (c) a mount located upon the tube and designed to receive the conveyor roll;
  (d) a bracket capable of being attached to the surface in fixed relation and having an inner boundary that is shaped to receive the outer boundary of the tube to allow axial translation of the tube within the inner boundary in a telescoping arrangement;
  (e) a screw rod having a first end and a second end, the first and second ends of the rod axially opposing each other and the rod threadably engaging with the floating nut at the rearward end of the tube, the floating nut compensating for offset and displacement of the screw rod;

(f) a stop that is attached to the screw rod in fixed relation between the first end of the screw rod and the second end of the screw rod;

(g) a second nut that threadedly engages with the screw rod proximate the second end of the screw rod;

(h) a buttress capable of being attached to the surface in fixed relation and which has a hole through which the screw rod passes, the turning of the rod when the buttress and the nut are spaced apart resulting in a translation of the tube and the mount by the insertion of the screw rod into and the withdrawal of the screw rod from the axial passageway.

* * * * *

UNITED STATES PATENT AND TRADEMARK OFFICE
CERTIFICATE OF CORRECTION

PATENT NO. : 5,054,608
DATED : October 8, 1991
INVENTOR(S) : Bryant

It is certified that error appears in the above-identified patent and that said Letters Patent is hereby corrected as shown below:

At column 2, line 43: cancel "use" and insert therefor --used--.

At column 3, line 61: cancel "based" and insert therefor --baked--.

At column 6, line 62: insert "," immediately after "32".

Signed and Sealed this

Thirteenth Day of April, 1993

Attest:

STEPHEN G. KUNIN

*Attesting Officer*     Acting Commissioner of Patents and Trademarks